US012444889B2

(12) United States Patent
Sun et al.

(10) Patent No.: US 12,444,889 B2
(45) Date of Patent: Oct. 14, 2025

(54) SHELL ASSEMBLY OF ELECTRICAL CONNECTOR AND ELECTRICAL CONNECTOR

(71) Applicant: BIZLINK (KUNSHAN) CO., LTD., Kunshan (CN)

(72) Inventors: Weike Sun, Kunshan (CN); Pengcheng Ruan, Kunshan (CN)

( * ) Notice: Subject to any disclaimer, the term of this patent is extended or adjusted under 35 U.S.C. 154(b) by 380 days.

(21) Appl. No.: 17/994,380

(22) Filed: Nov. 27, 2022

(65) Prior Publication Data

US 2023/0170651 A1 Jun. 1, 2023

(30) Foreign Application Priority Data

Nov. 29, 2021 (CN) ......................... 202111429438.8

(51) Int. Cl.

*H01R 13/66* (2006.01)
*H01R 13/405* (2006.01)
*H01R 13/502* (2006.01)
*H01R 13/58* (2006.01)

(52) U.S. Cl.

CPC ....... *H01R 13/6658* (2013.01); *H01R 13/405* (2013.01); *H01R 13/502* (2013.01); *H01R 13/5808* (2013.01)

(58) Field of Classification Search

CPC H01R 13/6658; H01R 13/405; H01R 13/502; H01R 13/5808
USPC ............................................ 439/660, 607.51
See application file for complete search history.

(56) References Cited

U.S. PATENT DOCUMENTS

| | | | | |
|---|---|---|---|---|
| 5,046,967 | A * | 9/1991 | Majernik | H01R 13/6599 439/736 |
| 5,833,945 | A * | 11/1998 | Sakuma | A01K 67/02 424/9.1 |
| 7,955,132 | B2 * | 6/2011 | Luo | H01R 13/6658 439/607.41 |
| 8,075,341 | B2 * | 12/2011 | Su | H01R 13/5845 439/607.51 |
| 9,748,687 | B2 | 8/2017 | Yokoyama | |
| 10,063,018 | B2 | 8/2018 | Xing et al. | |
| 2004/0127099 | A1 * | 7/2004 | Lin | H01R 13/514 439/607.51 |
| 2004/0147166 | A1 * | 7/2004 | Lai | H01R 13/6592 439/607.51 |
| 2005/0255752 | A1 | 11/2005 | Huang | |
| 2009/0311910 | A1 * | 12/2009 | Kleinke | H01R 43/24 439/607.51 |
| 2017/0093076 | A1 | 3/2017 | Yokoyama | |
| 2018/0115122 | A1 | 4/2018 | Xing et al. | |

FOREIGN PATENT DOCUMENTS

| | | |
|---|---|---|
| CN | 202042646 U | 11/2011 |
| CN | 107978901 A | 5/2018 |
| TW | M457321 U | 7/2013 |

* cited by examiner

*Primary Examiner* — Gary F Paumen
(74) *Attorney, Agent, or Firm* — AGMON LAW PTE LTD

(57) ABSTRACT

An electrical connector is provided, including a plug; a PCB, secured with the plug; a shell assembly, covering the plug and secured therewith, the shell assembly having a plurality of forward extending supporting arms suspending above the plug for forming a plurality of accommodating spaces between the supporting arms and the plug; and an insulating molding layer, covering at least a part of the plug and the whole of the shell assembly and filling the plurality of accommodating space.

8 Claims, 5 Drawing Sheets

P–P

SHELL ASSEMBLY OF ELECTRICAL CONNECTOR AND ELECTRICAL CONNECTOR

CROSS-REFERENCE TO RELATED APPLICATION

This application claims priority to CN application No. 2021114294388, having a filing date of Nov. 29, 2021, the entire content of which is hereby incorporated by reference.

TECHNICAL FIELD

The present invention relates an electrical connector, in particular to an electrical connector having a supporting arm.

BACKGROUND

Please refer to U.S. Pat. No. 10,063,018B2, a connector having a PCB, a plug, and a ring-shaped metal shell is disclosed. The PCB is coupled with a plug (mating unit), and a ring-shaped metal shell is utilized to cover the PCB and to secure the PCB with the plug. Furthermore, an insulative outer shell is assembled outside the metal shell to cover a portion of the plug and the whole metal casing for waterproofing.

In addition to using a pre-formed insulative outer shell for assembly as disclosed, it is also common to form an insulative molding layer directly onto the surface of the plug and the metal casing by injection molding. For the injection molding type connector, it is a common problem with injection molding is that the insulative molding layer may be detached from the surface of the plug and forms an opening H at the interface therebetween, resulting in poor waterproofing, increasing the defective rate of product.

SUMMARY

The purpose of the present disclosure is to overcome the defects of the conventional art and provide an improved shell assembly for an electrical connector.

In detail, to overcome the said problem of insulative molding layer detachment, in an embodiment, a cantilever-liked supporting arms are formed at a front portion of a shell for forming an accommodating space between the plug and the shell to allow molding material to be filled therein for forming the insulative molding layer, preventing the cause of said opening and decreasing the defective rate of product.

Moreover, to improve the strength of the shell, a reinforcing rib set having one or more reinforcing rib structure are formed on an outer surface of the shell from a front portion to the rear portion via the neck portion thereof, further preventing the undesired bending of the shell.

BRIEF DESCRIPTION

Some of the embodiments will be described in detail, with references to the following Figures.

FIG. 1 schematically shows a conventional connector.

Reference number: 1—shell assembly; 1A—upper shell; 1B—lower shell; 10-gap; 11—front portion; 11*a*—central portion; 11*b*—connecting arm; 12—neck portion; 13—rear portion; 13*a*—main body; 13*b*—outer edge; 13*c*—connection structure; 14—supporting arm; 15—rib; 16—cable fixing arm; 2—plug; 21—plug base; 3—PCB; 4—insulation cement layer; 5—cable.

DETAILED DESCRIPTION

In order to make the above objects, features and advantages of the present disclosure more clearly understood the present disclosure will be described in detail below with reference to the accompanying drawings and specific embodiments. In the following description, numerous specific details are set forth in order to provide a thorough understanding of the present disclosure. However, the present disclosure can be implemented in many other ways different from those described herein, and those skilled in the art can make similar improvements without departing from the connotation of the present disclosure, therefore, the present disclosure is not limited by the specific embodiments disclosed below.

The following descriptions of the orientations such as front, rear, left, right, up and down are all referenced and defined according to the view observed by the user when using the electrical connector for the plug-in operation, which is only for the convenience of describing the relative positional relationship of the components on the electrical connector, and should not be considered as a limitation on the specific positions of the corresponding structural features.

Referring to an electrical connector shown in FIGS. 2 to 6, it comprises a shell assembly 1, a plug 2, a PCB 3 and an insulating molding layer 4, wherein the PCB 3 is arranged in an inner cavity of the shell assembly 1, the rear portion of the plug 2 protrudes into the inner cavity of the shell assembly 1 and is connected with the PCB 3, and the shell assembly 1 covers the rear portion of the plug 2.

Figure 1:
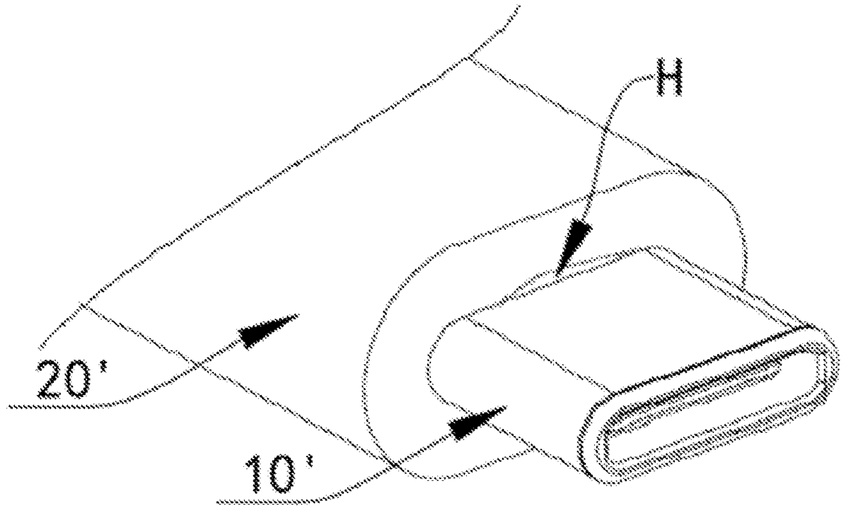
Figure 2:
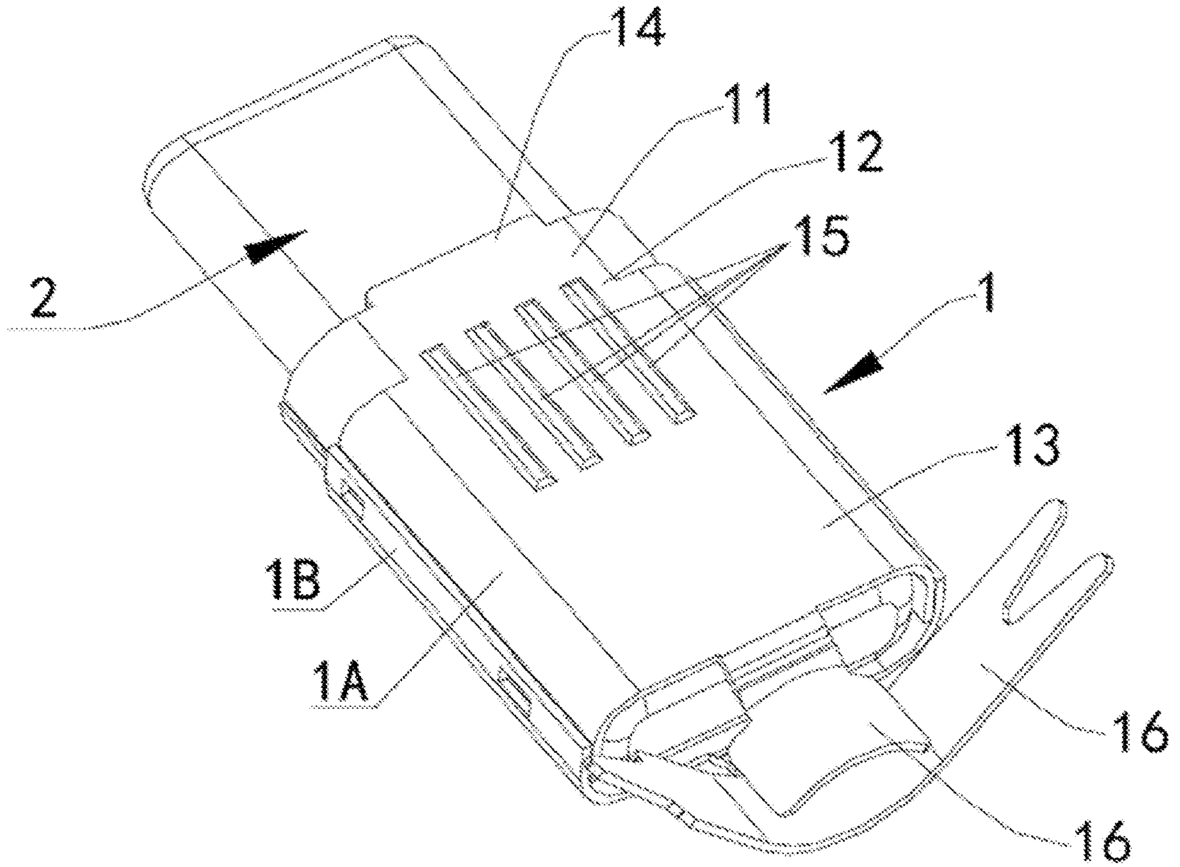
FIG. 2 is a schematic three-dimensional schematic diagram of an electrical connector according to a specific embodiment of the present disclosure, wherein an insulating molding layer is omitted.
Figure 3:
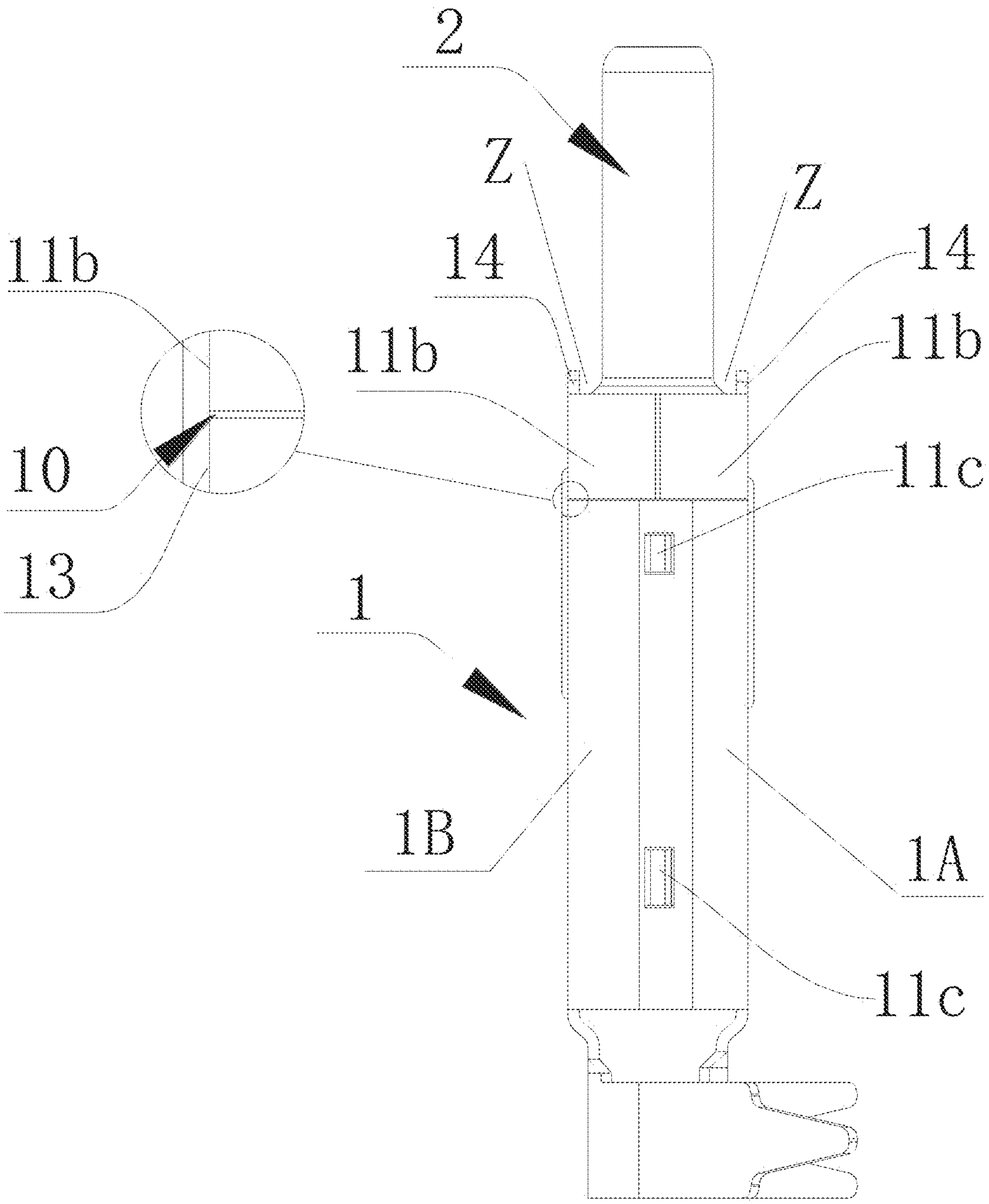
FIG. 3 is a side-view structure schematic diagram of the electrical connector of FIG. 2.
Figure 4:
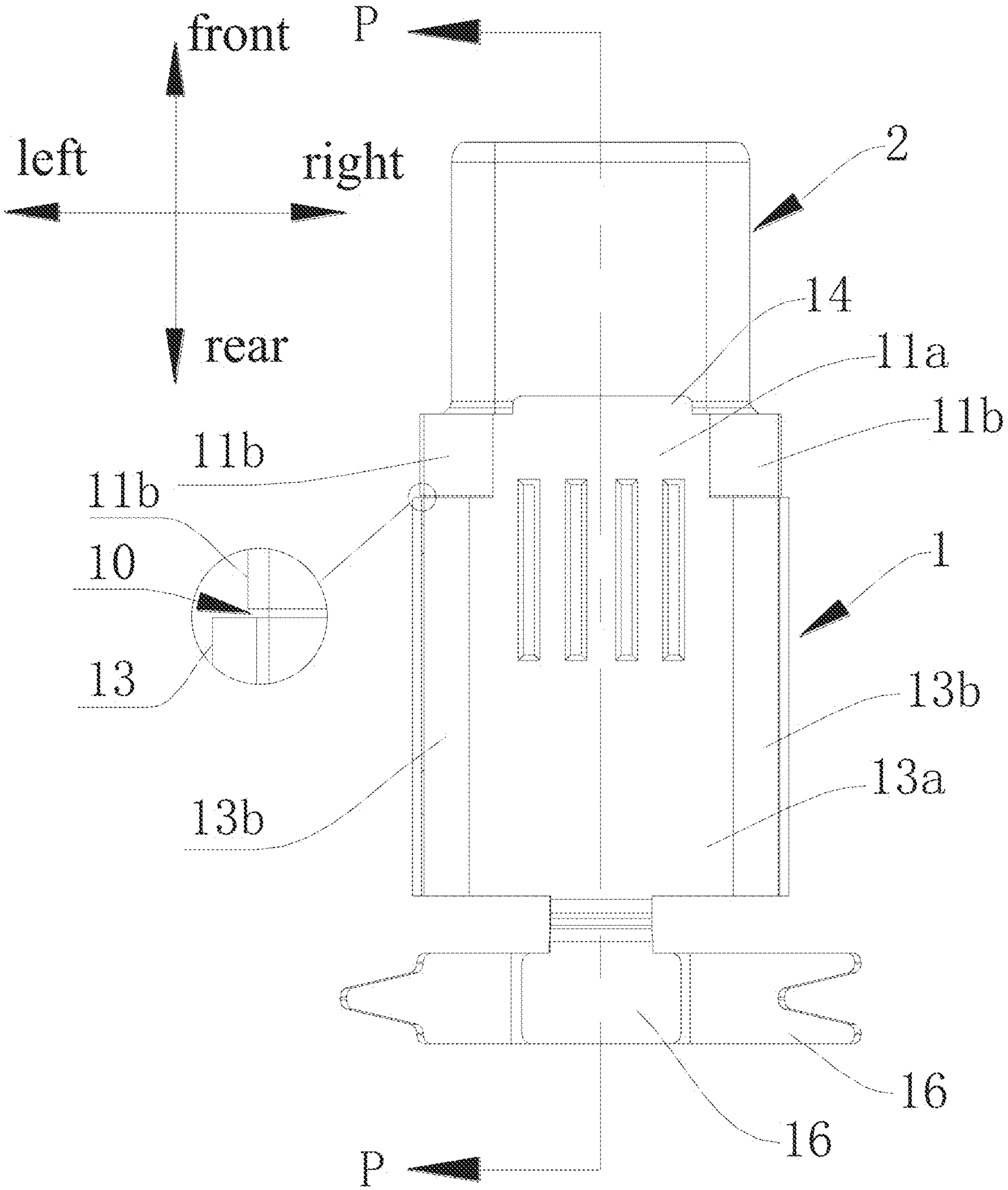
FIG. 4 is a front-view structure schematic diagram of the electrical connector of FIG. 2.
Figure 5:
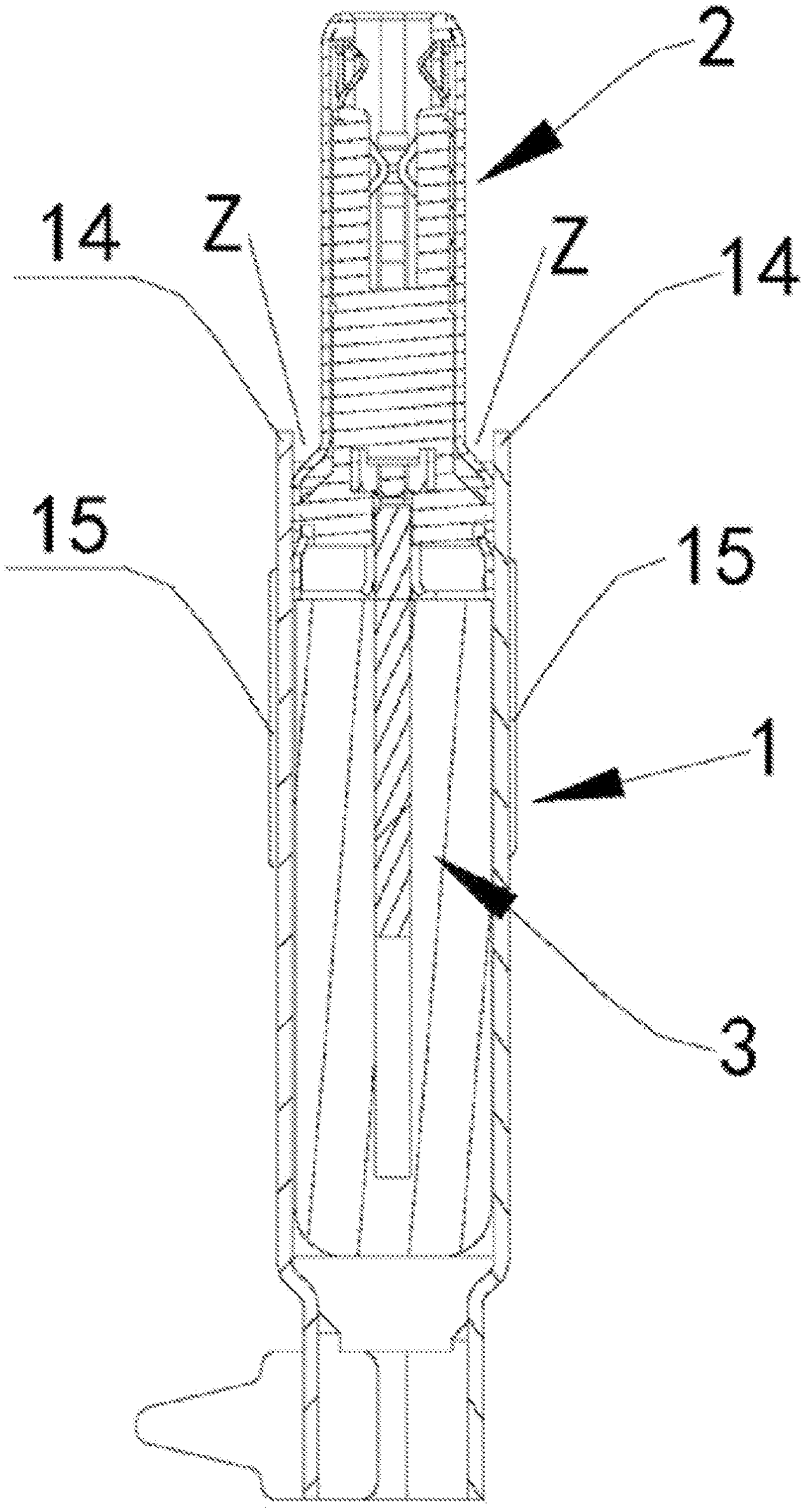
FIG. 5 is a sectional structure schematic diagram along the P-P line in FIG. 4.
Figure 6:
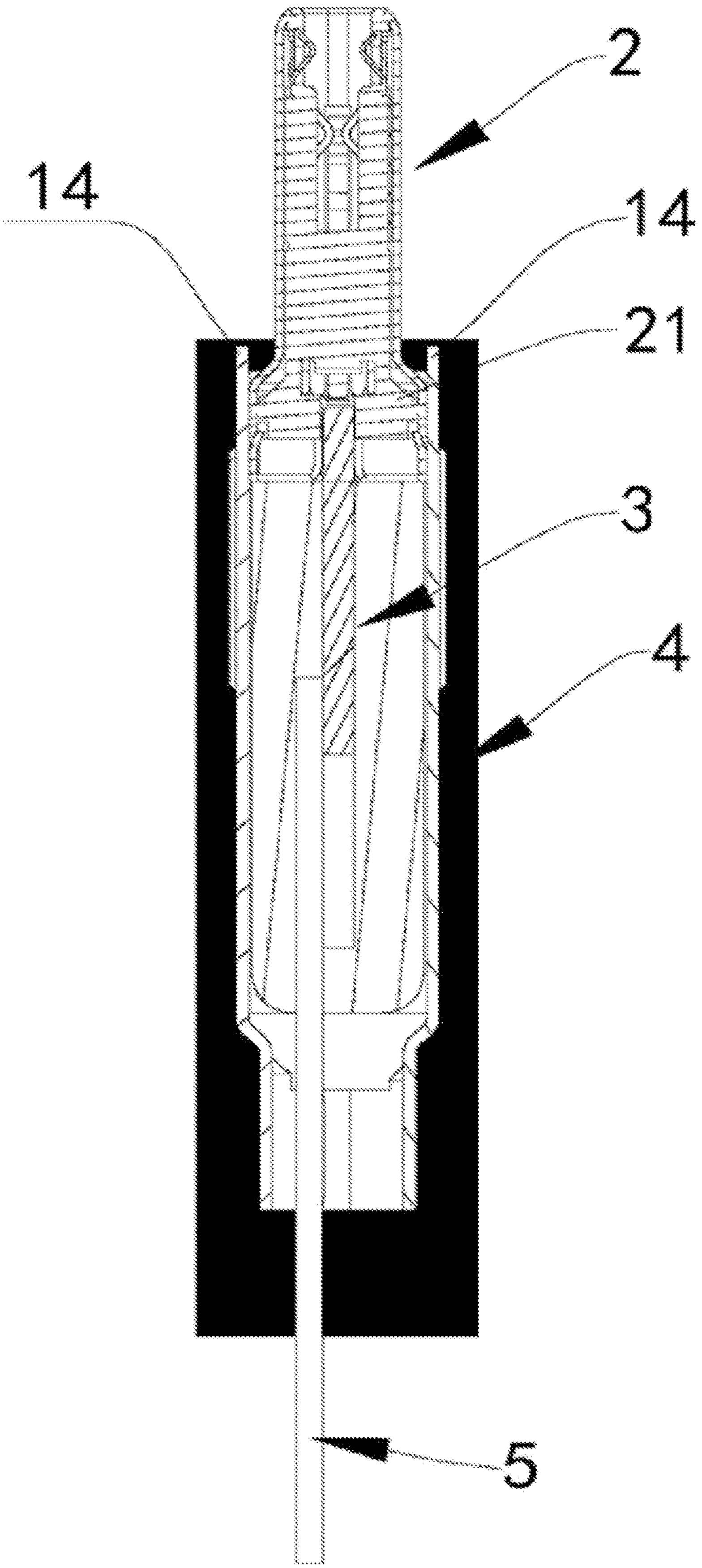
FIG. 6 is a schematic diagram of the electrical connector of FIG. 5 after adding an insulating molding layer and cables.

A plurality of cantilever-liked suspended supporting arms 14 extend forward from the front portion of the shell assembly 1, and an accommodating space Z is formed between the supporting arms 14 and the side surface of the plug 2, and the supporting arms 14 are used as a base on which the cement is attached, as shown in FIG. 6, the insulating molding layer 4 is formed by molding, and covers at least a part of the plug 2 and the whole of the shell assembly 1, and fills the accommodating space Z, so that the bite force between the shell assembly 1, the plug 2 and the insulating molding layer 4 is greatly increased, and it is not easy to form any opening between the plug 2 and the insulating molding layer 4. Wherein, the above-mentioned molding refers to the related process using molds, for example processes in which materials are injected into a mold and then formed after cooling, such as injection molding, the more common one is insert molding.

Specifically, the rear portion of the plug 2 has a plug base 21, the plug base 21 is connected to the PCB 3, and the shell assembly 1 covers the outside of the plug base 21. The shell assembly 1 comprises two shells that are vertically secured, which are respectively an upper shell 1A and a lower shell 1B, each of the upper shell 1A and the lower shell 1B comprises a front portion 11, a neck portion 12 and a rear portion 13, and the front portion 11, the neck portion 12 and the rear portion 13 are connected in sequence from front to rear.

The supporting arms 14 are formed by the end of the front portions 11 extending horizontally forward, specifically, each front portion 11 comprises a central portion 11*a*, a connecting arm 11*b* gradually curved and extending inward from the left edge of the central portion 11*a* to the left, and an another connecting arm 11*b* gradually curved and extending inward from the right edge of the central portion 11*a* to the right, wherein there are gaps 10 between each of the connecting arms 11*b* on the two sides and the rear portion 13 along the front-rear direction. The two connecting arms 11*b* are respectively attached to the left and right side surfaces of the plug base 21.

The front portions of the upper shell 1A and the lower shell 1B are respectively has a supporting arm 14, the supporting arm 14 on the upper shell 1A extends horizontally forward from the central portion 11*a* thereof, and the supporting arm 14 on the lower shell 1B extends horizontally forward from the central portion 11*a* thereof. The length of each supporting arm 14 is not less than 0.2 mm.

The central portion 11*a* of the upper shell 1A is attached to the front surface of the plug base 21, two side surfaces of the plug base 21 on the left and right sides are curved surfaces, that is, the plug base 21 has two lateral curved surfaces (not shown) respectively disposed on the left and right sides, the two connecting arms 11*b* on the left and right sides of the same shell are respectively bent and deformed to at least partially attach to the lateral curved surfaces on the two sides, wherein, on the left and right sides of the shell assembly 1, the connecting arms 11*b* of the upper shell 1A and the connecting arms 11*b* of the lower shell 11B are disposed at least partially overlapping on the lateral curved surface on the same side of the plug base 21. The arrangement of the above-mentioned connecting arms 11*b* makes the front portions 11 more closely with the plug base 21.

Each of the upper shell 1A and the lower shell 1B is one piece formed by a single metal material, and in a state in which the upper shell 1A and the lower shell 1B are not bent, the width of the neck portions 12 is twice or less than twice of the width of the connecting arms 11*b*. Each of the upper shell 1A and the lower shell 1B has a reinforcing rib set, and the reinforcing rib set crosses the front portion 11, the neck portion 12 and the rear portion 13 in the front-rear direction, so that the entire upper shell 1A or the lower shell 1B is not easily broken. Specifically, as shown in the figures, the reinforcing rib set is formed by combining a plurality of ribs 15 parallel to each other and arranged side by side in the left-right direction, and each of the ribs 15 is formed by deforming the shell assembly 1. The present disclosure is not limited to this, and when necessary, the reinforcing rib set may only comprise a single rib 15.

Each of the rear portions 13 of the upper shell 1A and the lower shell 1B comprises a main body 13*a* located in the middle and outer edges 13*b* respectively arranged on the left and right sides of the main body 13*a* and bent inward, the outer edges 13*b* are different from the connecting arms 11*b* in shape, and both have different curvatures. The rear portions 13 of the two shells are connected to each other along the outer edges 13*b*, and the outer edge of the upper shell 1A and the outer edge of the lower shell 1B are partially overlapped on the same side of the shell assembly 1 in the left-right direction, and a connection mechanism is arranged between them to be matched with each other and fixedly clamped together.

Cable fixing arms 16 are further arranged on the rear ends of the rear portions 13 to fixedly connect with a cable 5, a front end of the cable 5 extends into the shell assembly 1, and the part extending out of the shell assembly 1 is fixed by the cable fixing arms 16.

To sum up, in the electrical connector of this embodiment, the plurality of suspended supporting arms 14 extend forwards from the rear ends of the front portions on the left and right side of the shell assembly 1, so that an accommodating space Z is formed between the supporting arms 14 and the plug 2, and in the process of forming the insulating molding layer 4 in the molding process, the insulating molding layer 4 covers at least a part of the plug 2 and the whole of the shell assembly 1 and fills the accommodating space Z, so that the bite force between the shell assembly 1, the plug 2 and the insulating molding layer 4 is greatly increased, it is not easy to form any opening between the plug 2 and the insulating molding layer 4, and the defective rate of product is reduced.

Although the present invention has been disclosed in the form of embodiments and variations thereon, it will be understood that numerous additional modifications and variations could be made thereto without departing from the scope of the invention. For the sake of clarity, it is to be understood that the use of 'a' or 'an' throughout this application does not exclude a plurality, and 'comprising' does not exclude other elements.

What is claimed is:

1. An electrical connector, comprising:

a plug;

a printed circuit board (PCB), secured with the plug;

a shell assembly, covering the plug and secured therewith, the shell assembly having a plurality of forward extending supporting arms suspending above the plug for forming a plurality of accommodating spaces between the supporting arms and the plug, and an insulating molding layer, covering at least a part of the plug and the whole of the shell assembly and filling the plurality of accommodating space, wherein the shell assembly comprises two shells that are vertically secured, each of the shells comprises a front portion, a neck portion and a rear portion connected in sequence from front to rear, the front portion of one of the two shells comprises a central portion, and two connecting arms extending along a left-right direction from the central portion and curved towards other of the two shells, a gap is formed between the connecting arms and the rear portions respectively, the plug has a plug base attached to the two connecting arms.

2. The electrical connector according to claim 1, wherein the two shells are respectively an upper shell and a lower shell, the central portion of the upper shell is attached to a front surface of the plug base, the supporting arms extend horizontally and forwardly from the central portion, and the two connecting arms are respectively bent to at least partially attach to two lateral curved surfaces of the plug base.

3. The electrical connector according to claim 2, wherein the connecting arms of the upper shell are at least partially overlapping with the connecting arms of the lower shell.

4. The electrical connector according to claim 1, wherein the supporting arms are formed by extending horizontally forward from an end of the front portions.

5. The electrical connector according to claim 4, wherein the two shells are one piece formed by a single metal material respectively.

6. The electrical connector according to claim 5, wherein each of the two shells having a reinforcing rib set, extending from the front portion to the rear portion via the neck portion.

7. The electrical connector according to claim 6, wherein the reinforcing rib set is formed by deforming each of the two shells, and the reinforcing rib set comprises a plurality of ribs parallel to each other and arranged side by side in the left-right direction.

8. The electrical connector according to claim 1, wherein each of the two shells is further provided with the supporting arms, and length of the supporting arms is not less than 0.2 mm.

* * * * *